Aug. 28, 1923.

E. A. THOMPSON

POWER TRANSMISSION MECHANISM

Filed Sept. 19, 1919

Emory A. Thompson
Inventor

By Lancaster and Allwine
Attorneys

Aug. 28, 1923.

E. A. THOMPSON 1,466,214

POWER TRANSMISSION MECHANISM

Filed Sept. 19, 1919 4 Sheets-Sheet 4

Emory A. Thompson,
Inventor

Patented Aug. 28, 1923.

1,466,214

UNITED STATES PATENT OFFICE.

EMORY A. THOMPSON, OF HOPE, ARKANSAS.

POWER-TRANSMISSION MECHANISM.

Application filed September 19, 1919. Serial No. 324,964.

*To all whom it may concern:*

Be it known that I, EMORY A. THOMPSON, a citizen of the United States, residing at Hope, in the county of Hempstead and State of Arkansas, have invented certain new and useful Improvements in Power-Transmission Mechanisms, of which the following is a specification.

This invention relates to a power transmission designed for use upon motor vehicles, and an object of the invention is to provide a power transmitting mechanism for rotating the drive wheels of a motor vehicle, which will eliminate spinning of one wheel, in case it engages mud or a slick surface, and at the same time allowing flexibility of the wheels for turning corners, etc.

Another object of this invention is to provide a mechanism as specified, wherein the mechanism for transmitting motion from the axle to the wheel is contained in the wheel structure, eliminating the employment of a number of troublesome parts in the center of the housing, which break, and get out of order, in the usual form of differential mechanism employed in motor vehicles.

Another object of the invention is to provide in a transmission mechanism as specified, means whereby the wheels may be rotated either in a forward or a reverse direction, and a mechanism which allows flexibility for turning corners and which comprises a tread structure or portion of the wheel rotatable on the housing independently about the hub structure, the said structure being connected to the drive axle through the medium of a plurality of pawls, engageable in notches formed in the inner periphery of the tread portion, the said pawls being pivotally mounted, whereby upon the reversing of the direction of rotation of the axle, the position of the pawls will be reversed, for rotating the tread portion of the wheel in a reverse direction, and to provide wheels or discs which frictionally engage the stationary portion of the wheel structure and are operatively connected, upon the dropping of the pawls upon the reversing of the direction of the axle to rock the pawls to move them into engagement with the tread portion of the wheel for reversing the rotation thereof.

A further object of the invention is the provision of a power transmission device for use upon vehicles, and upon which either wheel will run idly over pawls when made necessary by turning corners, etc., when running in either forward or reverse direction, and which will give the required flexibility of wheels.

Other objects of the invention will appear in the following detailed description, taken in connection with the accompanying drawings, forming a part of this specification, and in which drawings.

Figure 1:
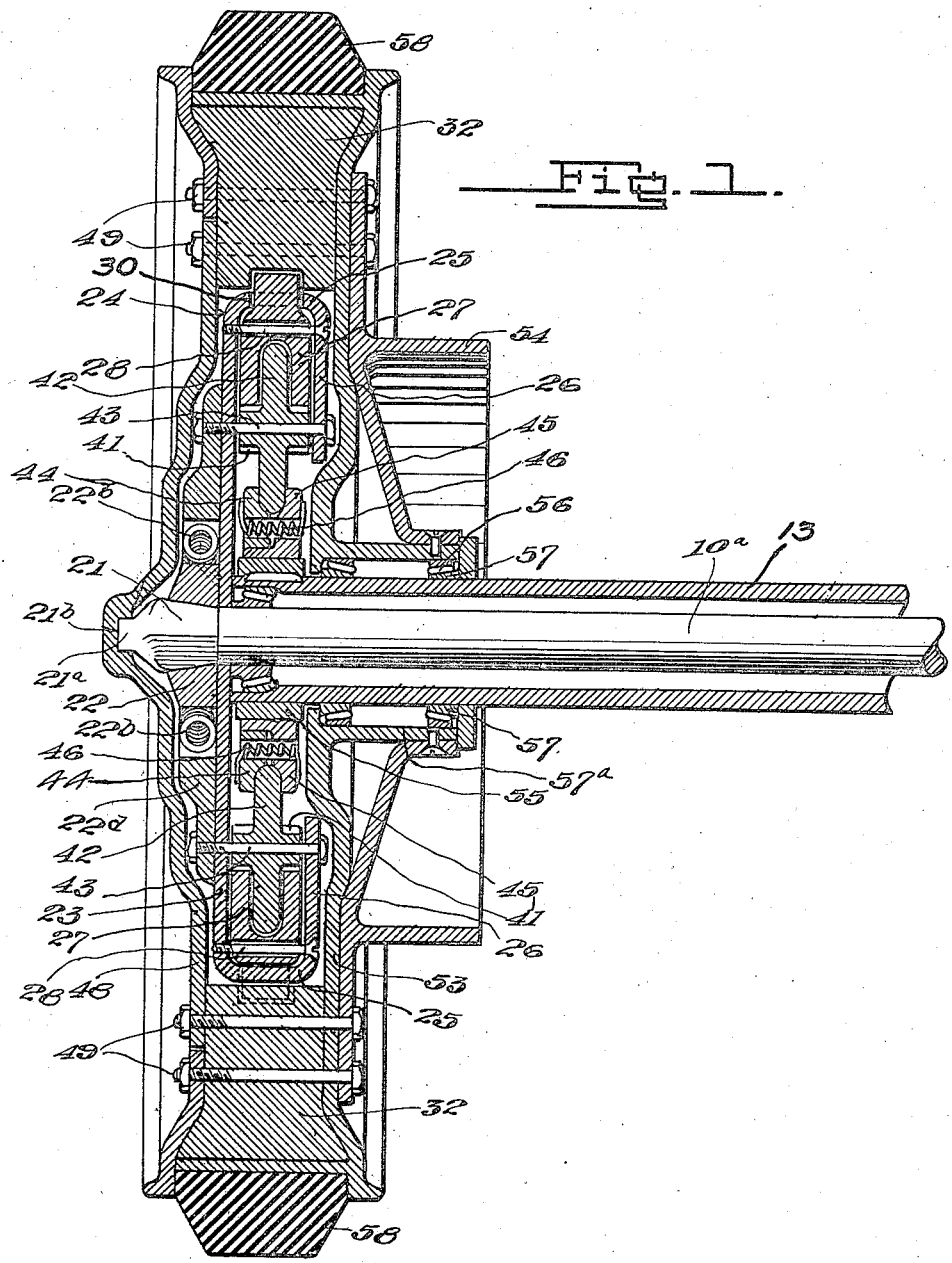
Figure 1 is a vertical section through the improved wheel showing the power transmitting mechanism associated therewith.
Figure 2:
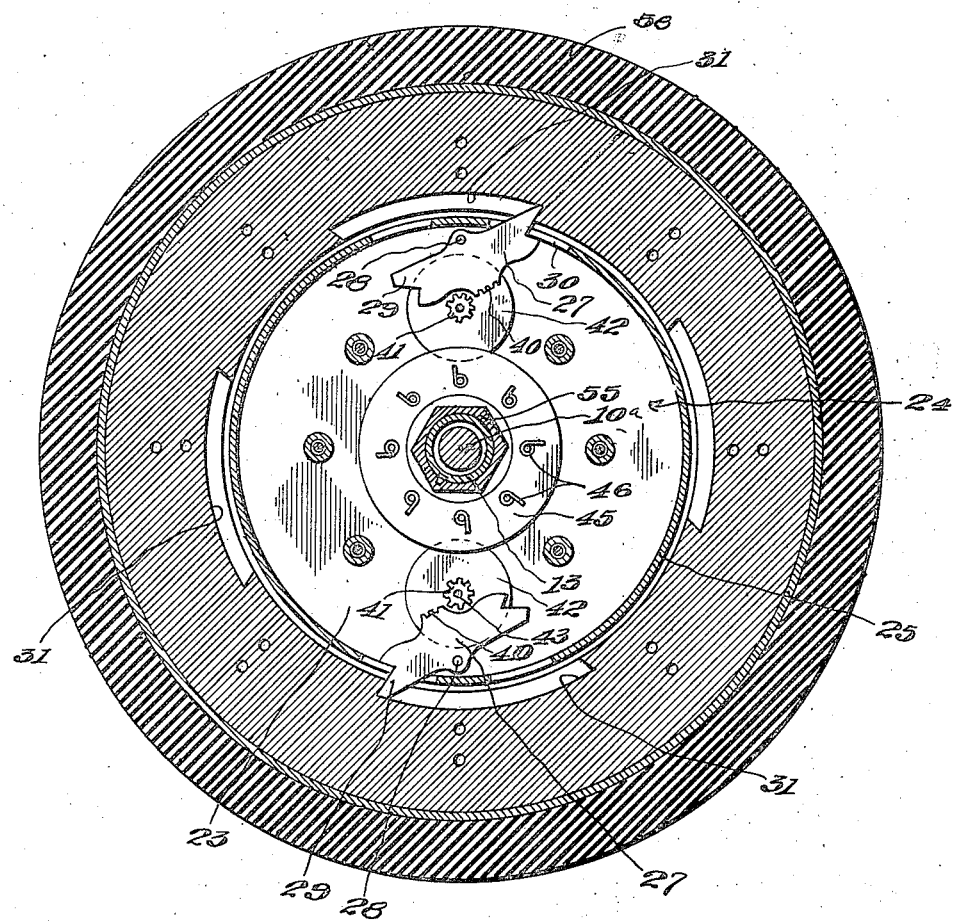
Figure 2 is a vertical section through the wheel taken transversely to the section illustrated in Figure 1.
Figure 3:
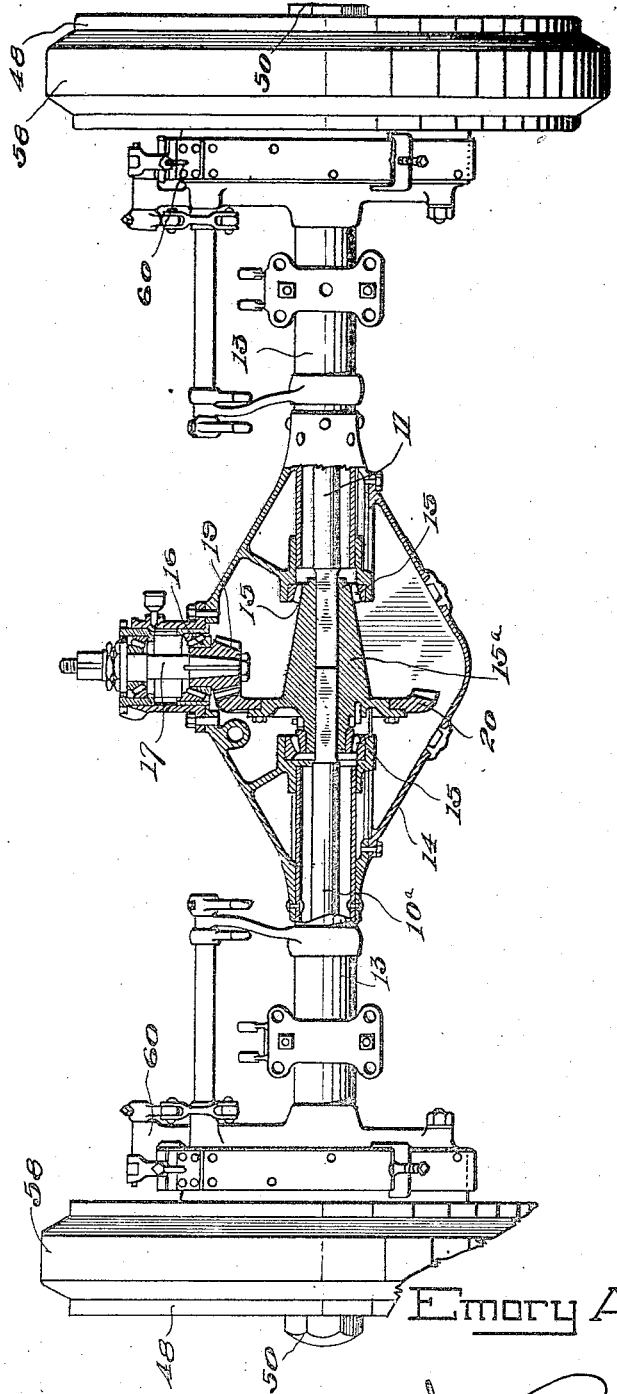
Figure 3 is a detail view of the drive axle of the motor vehicle, partly in side elevation and partly in section, showing the manner of connecting the axles proper to the prime mover or engine of the vehicle.
Figure 4:
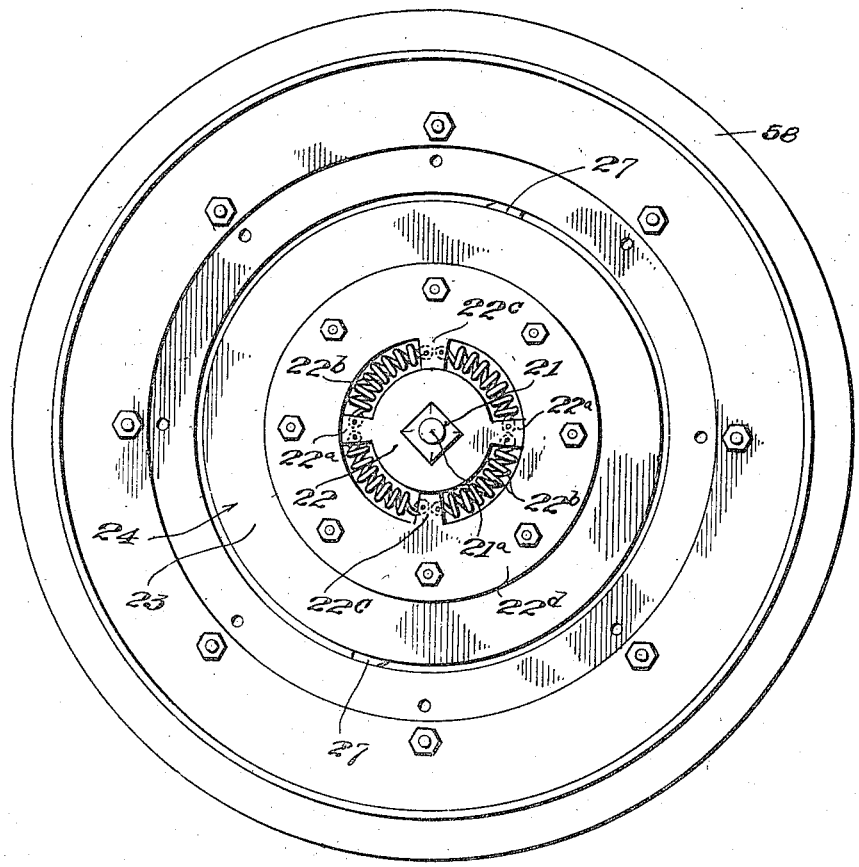
Figure 4 is a side elevation of the outer side of the wheel with hub plate removed, showing spring hub and manner of fitting axle in hub.

In the drawings, wherein for the purpose of illustration is shown the preferred embodiment of my invention, the axle is composed of sections $10^a$ and 11 and is enclosed in a housing structure, comprising end sections 13, and an intermediate enlarged portion 14, which receives the inner facing ends of the end portions 13 therein, as clearly shown in Figure 3 of the drawings. The inner ends of the axle sections $10^a$ and 11 are rectangular in cross section, and extend into a coupling member $15^a$ which is rotatably supported by bearings 15 within the portion 14 and these bearing structures are provided with sleeve portions, which fit over the ends of the end portions 13 of the housing.

The intermediate portion 14 of the housing has a bearing structure 16 carried thereby which rotatably supports a shaft 17. The shaft 17 is adapted to be operatively connected to the motor or engine of the motor vehicle. A bevelled gear 19 is carried by the shaft 17 and meshes with a bevelled gear 20 which is mounted upon the coupling $15^a$ for rotating the axle sections $10^a$ and 11 by rotation of the shaft 17.

Each of the axle sections $10^a$ and 11 has a squared portion 21 formed thereon adjacent its outer end outwardly of which is a circular bearing portion $21^a$ which rotatably engages in a socket or thrust bearing 21$^b$ formed in a removable hub plate 48.

Discs 22 are mounted upon the squared portions 21 of the axle sections, and they have radially extending lugs 22$^a$ formed thereon at diametrically opposed points, to which lugs springs 22$^b$ are connected. The spiral springs 22$^b$ are also connected to lugs 22$^c$ which are formed upon discs 22$^d$, forming a yieldable driving connection between the discs 22, and 22$^d$, and consequently between the axle structure and the discs 22$^d$. The discs 22$^d$ are attached to the discs 23 of the supporting casings 24.

In describing the wheel structures, only one will be specifically referred to, owing to the similarity of their construction. Each casing 24 comprises the disc 23, and an annular rim 25 which extends transversely to the disc 23, and a ring 26 formed upon the edge of the rim 25 remote from the disc 23 and extending parallel thereto. The disc 23 and ring 26 have a plurality of pawls 27 pivotally connected thereto, by means of bolts or analogous devices 28. These pawls 27 are each provided with notches in each end, the pawls being double ended, which notches form projections 29, one of which on each pawl projects through suitable openings 30, formed in the bight or annular portion 25 of the casing 24 and engages in one of a series of recesses 31 formed in the inner periphery of the rim 32 of the tractive portion of the wheel, for rotating this tractive portion from the axle section 10$^a$ or 11. The springs 22$^b$ prevent the transmission of shocks to the working parts of the wheel structure.

A disc 42 is provided for each pawl 27, having relatively small pinions 41 upon each side thereof and preferably integral therewith adapted for engagement, in certain instances to be subsequently set forth, with the rack teeth 40 upon said pawls 27. The discs 42 are each pivotally mounted by a pin 43, engaging transversely through the sides of the casing 24. The mechanism used for shifting the pawls 27, preferably includes a friction clutch mechanism, comprising the movable and rigid clutch sections 44 and 45 respectively, mounted upon a sleeve nut 55 keyed to the axle housing 13. The clutch mechanism is arranged so that the movable section 44 is yieldably maintained adjacent the rigid section 45, by contractile spiral springs 46, engaging through openings in said sections. The sections 44 and 45 are so positioned, that circumferential grooved edges thereof are adapted for frictionally engaging portions of the crown of each disc 42, for purposes to be subsequently set forth.

In operation, the axle sections 10$^a$ and 11 are driven through the bevel gears 19 and 20 mounted upon the drive shaft 17, and the axle section respectively. The shock of sudden starting is taken off at the vehicle wheel structure, due to the compression of the spiral springs 22$^b$ intermediate the various lugs 22$^a$ and 22$^c$ upon the discs 22 and 22$^d$. Rotation of the axle structure will, of course, rotate the casing 24, since the same is rigidly connected thereto in the manner above described. Due to engagement of one end 29 of each of the pawls 27 in the recesses 31 of the vehicle wheel structure 32, the vehicle wheel is propelled through the driving axle sections.

Assuming the vehicle to be going in forward direction, similar ends 29 of the pawls 27 upon the vehicle wheel will engage in recesses 31 of the vehicle wheel. However, as a reverse movement takes place, the pawl ends within the recesses 31 ride within said recesses until they come in contact with an edge of the vehicle wheel forming the recesses, and by reason of contact of an edge of said vehicle wheel, due to rotation of the casing 24, the pawls 27 are rocked downwardly until the ends 29 of each pawl are positioned entirely within the bight portion 25 of said casing 24. It is to be noted, that the friction clutch mechanism formed of the sections 44 and 45 does not rotate, and remains stationary upon the axle housing 13. However, due to rotation of the casing 24 in reverse direction, as above mentioned, the various discs 42 will be rotated relatively upon their pivot pins 43, thus rotating the pinions 41 integral therewith. When the pawls 27 are disposed within the casing 24, the rack teeth 40 thereon are engaged by the rotating pinions 41 to throw the pawls 27 upon their pivot pins 28 into reverse position, to place them through openings 30 in the bight portion 25, for engagement in recesses 31 of the vehicle wheel 32. In this connection, it is to be noted that the ends 29 of the pawls 27 now in engagement within the recesses 31 are the ends opposite to those ends above mentioned for driving the vehicle wheel in a forward manner. Further rotation of the axle structure in a reverse direction will result in the pawls 27 clutching within the recesses 31 to move the wheel structures 32 synchronously with the casings 24.

The mechanism within the casings 24 in fact, provides a differential action for each vehicle wheel structure, whereby the vehicle wheel 32 may rotate faster than the axle structure rotates the casing 24. It is readily obvious, that when driving forward, the wheeled structure 32 will of course, at times, tend to rotate faster than the casing 24. This will have the effect of rocking the pawls 27 upon the pivot pins until the same are entirely disposed within the casings 24 and out of engagement with the structure 32. However, there is a constant tendency of the pinions 41 to engage the rack teeth 40 upon each pawl 27, to force the pawls 27 into the recesses 31. In such manner, the wheel structure 32 may rotate faster than the casing 24.

The rim or tread structure 32 of the wheel has a plate 48 attached to the outer surface thereof by means of bolts 49 and this plate has the thrust bearing 21$^b$ formed thereon. When the plate 48 is removed the axle can be slipped out of the axle housing and the casing 24 removed, permitting the dismantling of the wheel structure.

The plate disc 53 which is attached to the inner side of the rim structure has the usual type of brake drum 54 attached thereto and it also has a hub structure 57$^a$ engaging partly about the housing 13. Roller bearings 56 are carried by the hub structure 57$^a$ and co-act with bearing surfaces 57 carried by the housing structure to permit rotation of the wheel structure with respect to the housing structure and eliminate to a material extent the creating of friction during such rotation. It is understood that any type of tire as indicated at 58 may be mounted upon the periphery of the wheel structure 32 and that it may be retained thereon in any approved manner.

In Figure 3 of the drawings, any approved type of brake mechanism as indicated at 60 is illustrated as employed in connection with the improved power transmission.

Changes in details may be made without departing from the spirit of this invention, but;

I claim:

1. In a power transmission for vehicles, the combination, of an axle structure, a housing therefor, wheels rotatably mounted upon said housing casings connected to the ends of the axle structure, rockable pawls pivotally carried by said casings, said wheels provided with recesses in their inner peripheries adapted to receive therein said pawls for operatively connecting the casings and the wheels for rotating the wheels by rotation of the axle structure, discs rotatably supported by said casings, pinions rotatable with said discs, racks mounted upon said pawls for engagement with said pinions to rock the pawls to reverse their connection with the wheels upon reversing of the direction of rotation of the axle structure.

2. In a power transmission for vehicles, the combination of an axle structure, a housing therefor, wheels, casings connected to the ends of the axle structure, rockable pawls pivotally carried by said casings, said wheels provided with recesses in their inner peripheries, adapted to receive therein said pawls for operatively connecting the casings and the wheels for rotating the wheels by rotation of the axle structure, discs rotatably supported by said casings, pinions rotatable with said discs, racks mounted upon said pawls for engagement with said pinions to rock the pawls to reverse their connection with the wheels upon reversing of the direction of rotation of the axle structure, retarding means carried by the axle housing, and comprising yieldable sections frictionally engaging said pinion carrying discs.

3. In a power transmission for vehicles, the combination of an axle structure, a housing therefor, supports mounted upon the ends of said axle structure, said axle structure provided with squared portions adjacent its ends, discs mounted upon said squared portions, discs attached to said supports, springs connecting said axle carried discs and said support carried discs to maintain yieldable connection between the axle structure and supports, wheels rotatably mounted about said supports, and means carried by the supports and said housing operatively connecting the axle structure and wheels.

4. In a power transmission for vehicles, the combination of an axle structure, casings mounted upon the ends of said axle structure, wheels rotatably mounted about said casings and provided with recesses in their inner peripheries, said axle structure provided with squared portions adjacent its ends, discs mounted upon said squared portions, discs attached to said casings, springs connecting said axle carried discs and said casing carried discs to maintain a yieldable driving connection between the axle and casings, a plurality of rockable pawls carried by the casings and adapted for engagement in certain of the recesses in said wheels to rotate the wheels by rotation of the axle structure.

5. In a power transmission for vehicles, the combination of an axle structure, casings mounted upon the ends of said axle structure, wheels rotatably mounted about said casings and provided with recesses in their inner peripheries, discs keyed to said axle ends, discs attached to said casings, springs connecting said axle carried discs and said casing carried discs to maintain a yieldable driving connection between the axle and casings, a plurality of rockable pawls carried by the casings and adapted for engagement in certain of the recesses in said wheels to rotate the wheels by rotation of the axle structure, and means for rocking said pawls to reverse their connection with the wheels upon reversing of the direction of rotation of the axle structure.

6. In a power transmission for vehicles, the combination of an axle structure, casings mounted upon the end portions of said axle structure, wheels rotatably mounted about said casings and provided with recesses in their inner peripheries, said axle structure provided with squared portions, adjacent its ends, discs mounted upon said squared portions, discs attached to said casings, springs connected to said axle carried discs and said casing carried discs to establish yieldable driving connection between the axle and casings, a plurality of rockable pawls carried by said casings and adapted for engagement in certain of the recesses of the wheels, to rotate the wheels by rotation of the casings, discs rotatably carried by the casings, pinions rotatable with said discs, racks formed upon said pawls for engagement with said pinions to rock the pawls to reverse their connection with the wheels upon reversing of the direction of rotation of the axle structure.

7. In a power transmission for vehicles, the combination with an axle structure and a wheel, of a casing disposed within said wheel, flexible means connecting said axle and said casing, pawls carried by said casing for engaging said wheel, means disposed within said wheel for actuating said pawls to permit driving of the wheel in either forward or reverse directions, said pawls and means cooperating in a differential manner to permit faster rotation of the wheel than of the axle or the casing.

8. A device of the class described, comprising in combination an axle, a housing for said axle, a casing, means yieldably mounting said casing for rotation with said axle, rocking pawls carried by said casing, a vehicle wheel disposed over said casing and bearing upon said axle housing for rotation, yieldable retarding means rigid on said axle housing, discs rotatably carried by said casing adjacent each of said pawls, pinions for rotation with each of said discs, said discs engaging said yieldable retarding means for rotation thereof relative to said casing, and adapted to operably shift said pawls into engagement with said vehicle wheel for forward or reverse driving of the same by the axle.

EMORY A. THOMPSON.